though a substantial period of experimentation has been avoided here for brevity.

United States Patent Office 2,943,943
Patented July 5, 1960

2,943,943
DYEING SOLUTION FOR COLORING CITRUS FRUITS AND METHOD OF DYEING CITRUS FRUITS

Herman J. Keller, 1000 Pinebrook Drive, Clearwater, Fla.

No Drawing. Filed July 10, 1957, Ser. No. 670,881

4 Claims. (Cl. 99—148)

This invention relates to improvements in methods for coloring citrus fruits and in particular is concerned with a method of dyeing citrus fruits in the yellow to orange range by a formulation containing bixin which is a derivative of annatto.

Considerable work has been done in the past to obtain formulations for coloring citrus fruits in the yellow to orange range. A particular problem has existed in obtaining a formulation which is from a completely nontoxic source and which is completely acceptable for health standards. There are a number of criteria which must be met for complete public acceptance. The formulation must color the citrus fruit in a natural color which does not streak and which does not fade under a reasonable period of time and which does not rub off. In addition, these standards must be met without sacrificing the requirement that the dye be nontoxic and completely compatible with public health standards. Although one or more of the standards have been met by formulations in the past, it has been a particular problem to provide a formulation for coloring citrus fruit which meets all the standards enumerated.

By means of the instant invention there has been provided a formulation and method for coloring citrus fruits in a natural yellow to orange range by a derivative of the annatto seed. This formulation provides a colored citrus fruit which completely meets with public health standards as it is nontoxic and noninjurious to human beings. In addition, the colored citrus fruits have a substantially permanent coloring over the normal period of life of the citrus fruit. The citrus fruits colored with the formulation and method of this invention are in a natural color which is nonstreaked and does not rub off under normal handling conditions.

The particular derivative of the annatto seed which is employed in this invention is bixin. The bixin material is substantially 95% pure and since it is a dark red crystal in the extracted form, it is employed with a suitable carrier in the way of a solution or an emulsion. The method of formulation is relatively simple when carried out under normal standards of control and the preparation of the formulation and the coloring of the citrus fruit lend themselves to advantageous employment in the industry.

Accordingly, it is a primary object of this invention to provide a formulation and method for coloring citrus fruit with an annatto derivative dye.

It is a further object of this invention to provide a formulation and method for coloring citrus fruit wtih an annatto derivative dye in which the colored fruit is completely compatible with public health standards and in which the coloring is of a completely natural appearance and is substantially permanent over the normal life and conditons encountered in handling of the fruit.

It is still another object of this invention to provide a formulation and method for coloring citrus fruit in which a bixin derivative of annatto is dissolved in a suitable carrier such as a solution or an emulsion and is applied to citrus fruit to color the same in a yellow to orange range which is compatible with public health standards and provides a substantially permanent coloring for the fruit.

Yet a further object of this invention is to provide a method and formulation for coloring citrus fruit with a bixin derivative of annatto which can be employed in an advantageous manner in industry under suitable control to provide a standardized coloring of citrus fruit and in which economy and simplicity in application are particular features of the invention.

Further objects of this invention will appear in the detailed description which follows and will be further apparent to those skilled in the art.

Annatto derivative dyes have been used in food products such as lard, vegetable shortening, oleomargarine, butter and cheese. However, annatto derivative dyes have not been employed upon citrus fruit. There is a particular problem involved in citrus fruits because of the oily chemical nature of the skin.

As an example of the difficulty which has been encountered in deriving the formulation and method of this invention, it has been found that emulsions of the annatto derivative dyes which have worked in other applications have not worked satisfactorily upon citrus fruits. Special formulations and treatments are required for the successful coloring of the citrus fruits. Thus, even though an emulsion containing the annatto derivative dye can be satisfactorily prepared, it has been found that such emulsions, if not made according to the critical requirements of this invention, will not color the citrus fruit.

The particular application of this invention finds special usefulness in the coloring of citrus fruits such as oranges, lemons and grapefruits. The annatto derivative found to be successful in this invention is bixin which can be obtained in about 95%+ purity. This derivative has a neutral pH and has 95,000,000 spectro-photometric units per gram. This product is in micro-crystalline solid form and may be used with a number of oil diluents or solvents.

It has been found that the annatto derivative in the form of bixin can be very satisfactorily employed as an emulsion. However, when so employed, conventional emulsion formulations have been found to be unsatisfactory. Thus when using a hydrocarbon solvent for the bixin and water with an amine and oleic acid as emulsifiers, it has been found that the proportion of the amine to oleic acid must be increased substantially beyond that which would be expected. Conventionally it might be expected that there would be a substantially lower proportion of the amine than the oleic acid, but contrary to this expectation, it has been found that the amine must be used in about equal amounts to the oleic acid or in even greater quantities. This relationship was determined after a substantial period of experimentation and was required to provide for proper coloring and permanency upon the dyed oranges.

As an example of one such satisfactory formulation there are illustrated below the component ingredients.

Example I 20 cc. dipentene
2 gr. dye (bixin)
5 cc. oleic acid
5 cc. amine
100 cc. water In the formulation procedure the dipentene, amine and oleic acid along with the dye are heated to about 220° F. in order to dissolve the dye. Then water is added to produce the emulsion. The heating is required as the dye will not dissolve in the dipentene solvent at room temperature. Where, however, other solvents are employed in which the dye is more readily soluble, the heating may be obviated. As an example, orange oil may be employed as the solvent in which case the dye will dissolve if stirred without the requirement of heating. In this formulation the oleic acid and the amine function as emulsifiers to produce a stable oil in the form of the dipentene and water emulsion. The above formulation was successful in dyeing oranges in the yellow-orange range. In order to provide a more nearly yellow dye for citrus fruits such as lemons and grapefruits, the amount of bixin is reduced while conversely the amount of bixin is increased to provide a more nearly orange dye.

Other solvents may be employed in the emulsion formulation of this invention. Such solvents may for example be orange oil, triopine, cotton seed oil, coconut oil, corn oil, soya bean oil and other solvents approved by the Pure Food and Drug Administration.

It has been found that when the amine is used in the amounts of substantially less than 50% of the oleic acid there is not produced an emulsion which is satisfactory for coloring oranges. However, such emulsions when used with a hydrocarbon solvent in water may be suitable for other applications than upon citrus fruits even when the amine is only in the amount of about 10% or so of the oleic acid. This is an unexpected result in this invention and apparently the chemistry of the skin of the citrus fruits is such that the use of lower amounts of the amine preclude the successful application of such formulations. It has been found that when used in the proper amount identified above that various amines may be employed such as, triethanolamine, monoethanolamine and morpholine.

Another feature of the emulsion formulation of this invention requires that the pH be maintained between neutral and a pH of 13. If the solution is a little bit on the acid side there will not be the proper coloring. Likewise if it goes beyond a pH of 13 the dye switches from an oil soluble dye to a water soluble dye and will not color citrus fruit properly.

As another consequence of this invention it has been found that where desired an oil soluble solution of the annatto derivative dye may be employed. Thus the annatto derivative, i.e., bixin, may be dissolved in an oil soluble solution such as dipentene, orange oil, corn oil and the like. These solvents are not miscible with water and are lighter than water. This solution is preferably obtained by heating the mixture to 240° F.

This application has certain desirable features because in an emulsion formulation and process 90% of the dye may be thrown away because of the breaking down of the emulsion caused by lapse of time or contamination with the foreign matter carried by the oranges, water, etc. In the solution use of the dye some waste material on the dye would be carried out of the applicator where the fruit is dyed, but this is substantially negligible. Oranges are first introduced into a washer and then go into the oil bath solvent containing the dye. Water is permitted to separate from the fruit and sink to the bottom of the tank where it may be drained off as the bottom immiscible unusable layer. The treated oranges may be washed of the excess oil.

Various changes and modifications may be made within this invention as will be apparent to those skilled in the art. Such changes and modifications are within the scope and teaching of this invention as defined by the claims appended hereto.

What is claimed is:

1. A method of dyeing citrus fruits in the yellow to orange range with an oil soluble dye which comprises dissolving an annatto derivative in a hydrocarbon solvent, oleic acid and an amine in which the amine is present in about at least equal amounts in relation to the oleic acid, emulsifying the mixture with water, maintaining the mixture at a pH between neutrality and 13, and applying the emulsion to the skin of citrus fruit to dye the same.

2. The process of claim 1 in which the annatto derivative is a bixin material.

3. A dyeing solution for coloring citrus fruits in the yellow to orange range consisting essentially of an annatto derivative, a hydrocarbon solvent, water, oleic acid and an amine, said amine being present in about at least equal amounts in relation to the oleic acid and said solution having a pH between neutrality and 13.

4. The solution of claim 3 in which the annatto derivative is essentially bixin.

References Cited in the file of this patent

UNITED STATES PATENTS

| | | |
|---|---|---|
| 59,975 | Dake | Nov. 27, 1866 |
| 1,909,860 | Harvey | May 16, 1933 |
| 2,503,665 | Gericke | Apr. 11, 1950 |